United States Patent
Yanagisawa et al.

[11] Patent Number: 5,729,118
[45] Date of Patent: Mar. 17, 1998

[54] VARIABLE SPEED INDUCTION GENERATOR-MOTOR WITH CONTROLLABLE EXCITATION FREQUENCY

[75] Inventors: Tadahiro Yanagisawa, Fuchu; Takahisa Kageyama, Suginami-ku, both of Japan

[73] Assignee: Kabushiki Kaisha Toshiba, Kawasaki, Japan

[21] Appl. No.: 475,652

[22] Filed: Jun. 7, 1995

[30] Foreign Application Priority Data

Jun. 17, 1994 [JP] Japan .................................. 6-135257

[51] Int. Cl.$^6$ ........................................................ H02P 9/00
[52] U.S. Cl. ........................... 322/29; 322/32; 322/20
[58] Field of Search .................................. 322/29, 47

[56] References Cited

U.S. PATENT DOCUMENTS

| | | | |
|---|---|---|---|
| 3,832,625 | 8/1974 | Gyugyi | 322/47 |
| 4,401,938 | 8/1983 | Cronin | 322/29 |
| 4,625,125 | 11/1986 | Kuwabara | 290/52 |
| 4,713,595 | 12/1987 | Yonemoto | 318/759 |
| 4,766,360 | 8/1988 | Haraguchi et al. | 318/732 |
| 4,794,316 | 12/1988 | Uchino et al. | 322/47 |
| 4,870,339 | 9/1989 | Furukawa et al. | 322/29 |
| 4,980,629 | 12/1990 | Bando et al. | 318/799 |
| 4,994,684 | 2/1991 | Lauw et al. | 290/52 |
| 5,029,288 | 7/1991 | Kubota et al. | 322/29 |

FOREIGN PATENT DOCUMENTS

| | | |
|---|---|---|
| 0 141 372 | 5/1985 | European Pat. Off. . |
| 0 220 492 | 5/1987 | European Pat. Off. . |
| 0 267 583 | 5/1988 | European Pat. Off. . |

OTHER PUBLICATIONS

Sugimoto et al., "Development of Adjustable Speed Pumping-Generating Units", Hitachi Review, vol. 37, No. 6, (1988) pp. 439–446.

Patent Abstracts of Japan, vol. 005, No. 149 (E–075), 19 Sep. 1981 & JP-A-56 081098 (Mitsubishi Electric Corp) 2 Jul. 1981.

Patent Abstracts of Japan, vol. 013, No. 232, (E–765), 29 May 1989 & JP-A-01 039297 (Mitsubishi Electric Corp) 9 Feb. 1989.

*Primary Examiner*—Thomas M. Dougherty
*Assistant Examiner*—Nicholas Ponomarenko
*Attorney, Agent, or Firm*—Foley & Lardner

[57] ABSTRACT

A variable velocity apparatus includes a wound-rotor induction machine having a primary winding connected to a power system having a power system frequency, a secondary winding excited by an alternating current (AC), a generator-motor shaft, and a load united with the generator-motor shaft. The apparatus includes a frequency detection element for detecting a change in the power system frequency, and a controller for changing a rotational speed of the induction machine based on the detected change in the power system frequency. The change in the rotational speed is made substantially equivalent to the detected change in the power system frequency, so as to maintain a slip frequency of the induction machine essentially constant when the power system frequency changes.

8 Claims, 16 Drawing Sheets

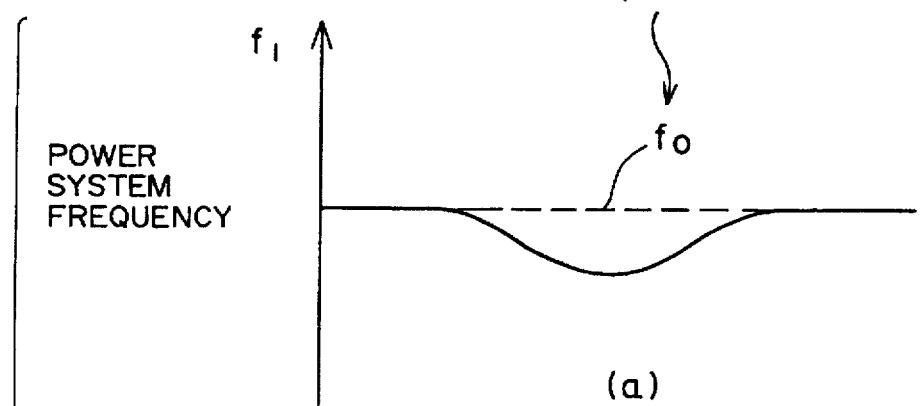
(a)
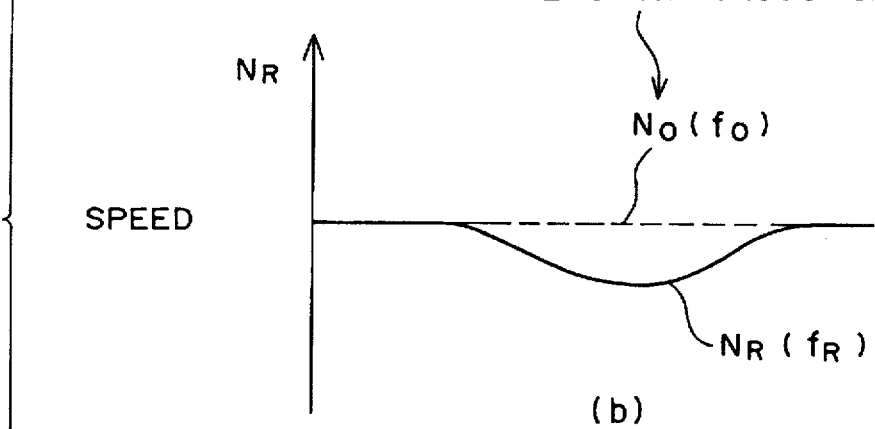
(b)
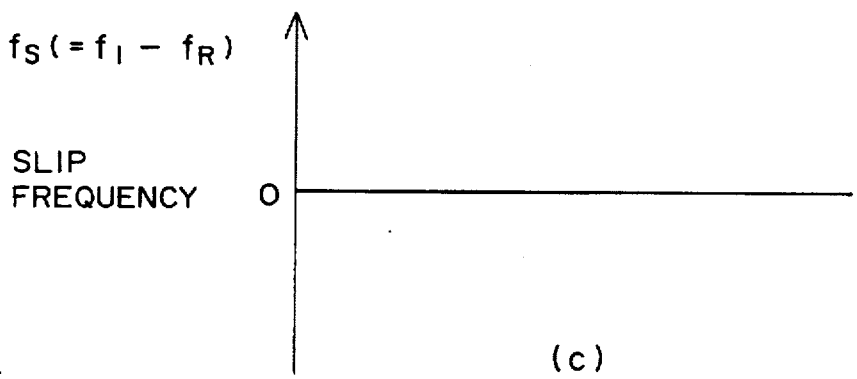
(c)
FIG. 3 PRIOR ART

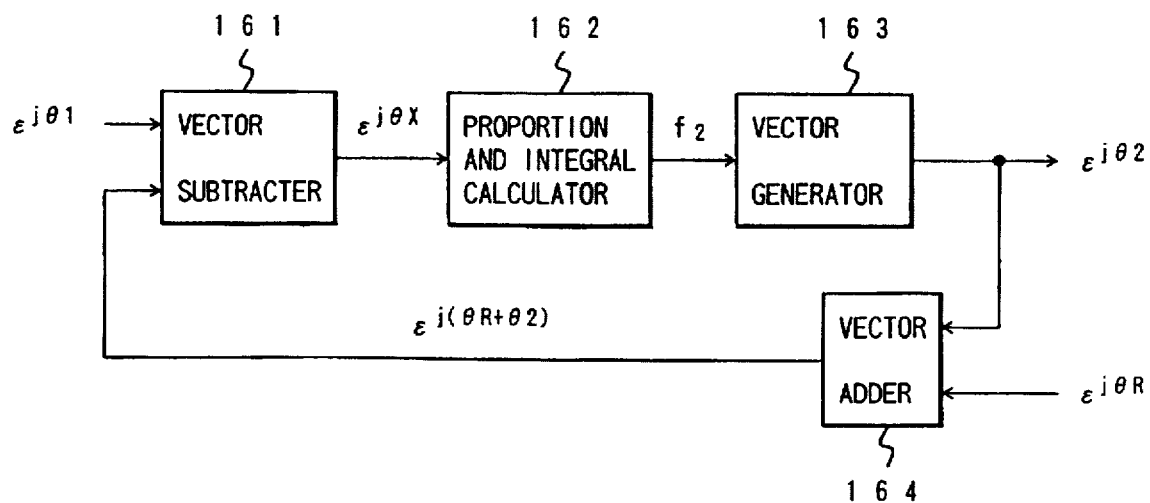
F I G. 9
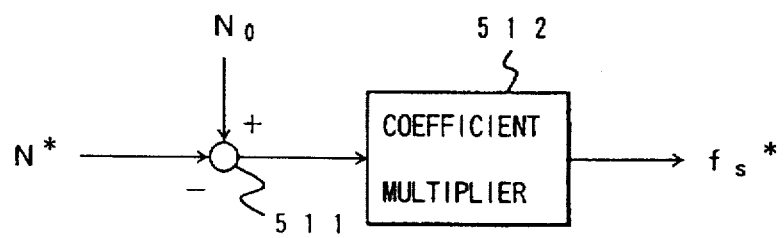
F I G. 1 0

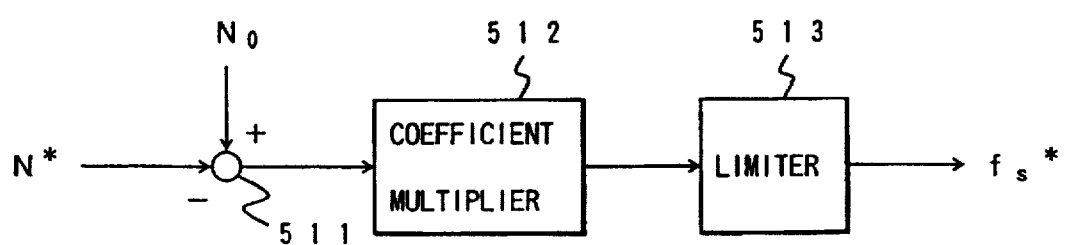
F I G. 1 3

VARIABLE SPEED INDUCTION GENERATOR-MOTOR WITH CONTROLLABLE EXCITATION FREQUENCY

BACKGROUND OF THE INVENTION

The present invention relates to a variable speed generator-motor apparatus capable of improving stability of a power system. More specifically, the present invention relates to an apparatus that can control a slip frequency of a generator (or motor) to not change even though a power system frequency changes.

A variable speed generator-motor apparatus is utilized by using a wound-rotor induction generator-motor in the place of a conventional generator-motor apparatus using a synchronous machine. The variable speed generator-motor apparatus comprises a wound-rotor induction generator-motor (hereunder called as an induction machine) having a primary winding connected to a power system and a secondary winding excited by an alternating current (AC), and a prime mover as a load united with a generator shaft of the induction machine. Since the generator-motor apparatus can be driven at a rotating speed different from a synchronous speed determined by a system frequency, it is possible to optimize operation efficiency and to suppress jolting in the conventional synchronous machine when trouble occurs in the system. However, it is necessary to excite a secondary winding by an alternating current having a frequency decided by a difference between synchronous speed and rotating speed for operating the machine at a rotating speed different from a synchronous speed (see the journal of the Japanese institution for electricity, March, 1986).

Here, a synchronous speed $N_1$ is determined by a system frequency $f_1$ and a number of polarities p of the generator-motor, and $N_1$ is defined as "$N_1=120f_1/p$". Accordingly, the synchronous speed $N_1$ is not a fixed value and changes with a change of the system frequency $f_1$.

The variable speed generator-motor apparatus has features such that optimum control of the rotating speed can be performed without fixing to the synchronous speed determined by the system frequency, and that the secondary winding is excited by an alternating current having a frequency determined by a difference between the synchronous speed and rotating speed.

Since the variable speed generator-motor apparatus can control active power of the induction machine by an alternating current excitation control device, and since torque of the prime mover as the load can be controlled by a prime-mover/load control device, both of the alternating current excitation device and the prime-mover/load control device can control the rotating speed (refer to a report No. 1026 of a national convention of the Japanese institution of electricity on Syowa 61st -1986-).

Japanese patent Applications Laid-open No. 61-247299 (1986) and No. 3-51910 (1991) show an example in which an AC excitation control device controls a rotating speed. Further, Japanese patent application Laid-open No. 1-231698 (1989) shows an example in which, though it does not show a prime mover in any figures, a prime-mover/load control device controls a rotating speed.

Since the example of the application No. 1-231698 has the AC excitation device (cycloconverter) for controlling only reactive power, a rotating speed is controlled by other control devices, such as a prime mover control device which is not shown in the figures.

There will be described a conventional configuration and function of a variable speed generator-motor apparatus by an example of a variable speed pumped-storage power generation system.

In the following description, all of variables and constants are dimensionless values caused by respective standard values of it, and symbols $e^{j\theta_1}$, $e^{j\theta_2}$, $e^{j\theta_R}$, $e^{j(\theta_2+\phi^*)}$ correspond to exponent functions.

For example, there is $e^{j\theta_1}=EXP(j\theta_1)$. Accordingly, even though various unit amounts are used in the figures, the values are performed by dimensionless processing. Even when addition and subtraction are directly performed among the different unit amounts, it is no problem in actuality.

At first, there is described a first example of a variable speed pumped-storage generation system in which an AC excitation control device controls a rotating speed. FIG. 1 shows a system constitution of the AC excitation control device.

In FIG. 1, a wound-rotor induction generator-motor 1 (hereunder called as an induction machine) has a rotor which is connected to a reversible pump turbine 2, and a secondary winding which is excited by a cycloconverter 3 as a frequency converter by an alternating current. During a variable speed operation, a function generator 8 obtains an optimum rotating speed and guide vane opening degree on the basis of an output P* of a reactive power setter 6 and an output H of a head detector 7 to output a rotating speed command N* and a guide vane opening degree command Y*, respectively.

A guide vane opening control device 140 comprises a guide vane opening controller 41 and a subtracter 42 for calculating a difference between the guide vane opening degree command Y* and an actual guide vane opening degree Y, and controls the actual guide vane opening degree Y of the reversible pump turbine 2 to coincide with the guide vane opening degree command Y* through a servo motor 4.

A voltage control device 120 comprises a voltage controller 21 and a subtracter 22 for calculating a difference between an output V* of the voltage setter 5 and a primary voltage $V_1$ of the induction machine 1 detected by a voltage transformer 17 and a voltage detector 23, and calculates a d-axis current command value $I_d^*$ to cause the output V* of the voltage setter 5 to be equal to the primary voltage $V_1$ of the induction machine 1.

Here, a d-axis current is a current component which lags with 90 degree from the primary voltage $V_1$ of the induction machine 1, and is proportional to reactive power.

A speed control device 130 comprises a speed controller 31 and a subtracter 32 for calculating a difference between a rotating speed command N* and a speed signal $N_R$ which are respectively obtained by a speed signal generator 33 and a speed detector 34, in which the generator 33 is installed at the rotor of the induction machine 1 and outputs an alternating current signal having a frequency in proportion to a rotating speed, and the detector 34 generates a voltage in proportion to the frequency. The device 130 calculates a q-axis current command value $I_q$ to cause the speed signal $N_R$ to be equal to the rotation speed command N* on the basis of the difference.

An Idq-axis current detection device 100 comprises a phase locked loop (PLL) circuit 16 for detecting a phase reference $e^{j\theta_R}$ of a secondary current of the induction machine 1 on the basis of the phase $e^{j\theta_1}$ of the primary voltage $V_1$ of the induction machine 1 detected by the voltage transformer 17 and a phase detector 19, a current detector 15 for detecting a secondary current $i_2$ of the induction machine 1, and an Id/Iq-axis current detector 14 for detecting an Idq-axis current on the basis of the secondary current $i_2$ and its phase reference $e^{j\theta_2}$ of the secondary current of the induction machine 1, so as to detect the d-axis current Id and q-axis current Iq of the secondary current of the induction machine 1.

Here, the phase signals "$e^{j\theta_R}$", "$e^{j\theta_1}$" and "$e^{j\theta_2}$" are respectively corresponding to a vector "$\cos\theta_R + j\sin\theta_R$" determined by an electric angle $\theta_R$ of the rotor, a vector "$\cos\theta_1 + j\sin\theta_1$" determined by the phase angle $\theta_1$ of the voltage $V_1$, and a vector "$\cos\theta_2 + j\sin\theta_2$" determined by "$\theta_1 - \theta_R$" (called as $\theta_2$).

Next, there is described a second example of the conventional variable speed pumped-storage generation system in which a guide vane opening control device controls a rotating speed with reference to FIG. 2 showing a system constitution thereof.

In FIG. 2, since respective configurations are the same as those shown in FIG. 1, there is omitted the duplicated description with respect to the induction machine 1; the pump turbine 2; the cycloconverter 3; active power setter 6; the head detector 7; the function generator 8; the servo motor 4; the guide vane opening control device 140 including the guide vane opening controller 41 and subtracter 42; the voltage setter 5; the voltage control device 120 including the voltage transformer 17, voltage detector 23, subtracter 22 and voltage controller 21; the Idq-axis detection device 100 including the phase detector 19 of the rotor, voltage transformer 17, phase detector 18 of system frequency, PLL circuit 16, current detector 15 and Id/Iq-axis detector 14; and the secondary current control device 110 including the subtracter 12 and current controller 11.

Contents different from FIG. 1 reside in that a speed control device 160 is provided in the place of the speed control device 130 and comprises a speed controller 31, subtracter 32 and adder 33 to correct an output Nc of the speed controller and guide vane opening degree command value $Y^*$ so as to calculate a corrected guide vane opening degree command value $y^{*1}$, and that an active power control portion 170 is added and comprises a current detector 71, active power detector 72, subtracter 73 and active power controller 74.

In the active power control portion 170, the active power controller 74 outputs a q-axis current command value $I_q^*$ in the manner of coinciding an output P of the active power detector 72 with an active power command value $P^*$.

Furthermore, the speed control device 160 outputs the signal Nc for correcting the guide vane opening command value $Y^*$ to coincide the rotating speed $N_R$ with the speed command value $N^*$, and the guide vane control device 140 operates in the manner of coincide in the guide vane opening degree Y with the corrected guide vane opening degree command value $Y_1^*$. If the function generator operates properly, the corrected signal Nc is zero.

Accordingly, since the configuration shown in FIG. 2 can operate in the same manner of the system shown in FIG. 1, namely, $V=V^*$, $N_R=N^*$, $Y=Y^*$, $I_d=I_d^*$ and $I_q=I_q^*$, it is possible to properly operate the system with a head H against an active power set value $P_R$ under the voltage $V^*$, thereby operating the system by a rotating speed $N^*$ and a guide vane opening degree $Y^*$.

In the conventional variable speed generator-motor apparatus, since it is possible to control the system at an optimum rotating speed in practice without a fix at a synchronous speed determined by a system frequency, the following problems occur by controlling the rotating speed apart from the system frequency in spite of various features.

A first problem resides in that a large change of a power system frequency or rotating speed causes operation of the system to be disabled.

A voltage occurring in the secondary winding of the induction machine 1 is proportional to a slip S. When the voltage in the secondary winding is over a voltage $V_{2MAX}$ outputted from a cycloconverter, the cycloconverter can not control a secondary current of the induction machine 1, thereby disabling an continuity of operation. The slip S is determined by the synchronous speed $N_1$ and the rotating speed $N_R$ of the induction machine 1, and also can be represented by a frequency thereby to describe an equation (1) as follows:

$$S=(N_1-N_R)=(f_1-f_R)/f_1 \qquad (1)$$

As understood from the equation (1), even though the rotating speed ($N_R$, namely, the frequency $f_R$) is constant, a large change of the power system frequency $f_1$ causes operation to be disabled by increasing the slip S. For example, when the frequency $f_1$ is 100%, the frequency $f_R$ is 95% and the slip S is 5%, if the frequency $f_1$ changes to 105%, the slip S is 10%.

In the same manner, even though the power system frequency ($f_1$, namely, the speed $N_1$) is constant, a large change of the rotating speed causes operation to be disabled by increasing the slip. For example, when the speed $N_1$ is 100%, $N_R$ is 95% and the slip is 5%, if the speed $n_R$ changes to 90%, the slip S is 10%. Especially, in the variable speed generator-motor apparatus controlling the rotating speed by a guide vane control, since the rotating speed largely changes at changing the active power, the slip is large thereby to disable operation. Accordingly, it is necessary to take a countermeasure to the problem.

A second problem resides in that synchronizing power can not contribute a suppression of frequency changes of the power system because synchronizing power is suppressed.

There is described as an example a case where the power system frequency decreases. When the power system frequency decreases in the conventional generator-motor apparatus using a synchronous machine, an output of the generator-motor increases during generating operation, thereby decreasing a speed to the rotating speed corresponding to the power system frequency to keep synchronized operation with the power system. When operation is during a pumped storage operation, an input of the synchronous machine decreases, thereby decreasing the speed to the rotating speed corresponding to the power system frequency to keep the synchronized operation with the power system.

A synchronizing power is called with respect to an increase of the output and a decrease of the input of the synchronous machine in this case. The synchronizing power is a change in the direction of a suppression to the decrease of the power system frequency so as to contribute a suppression of a change of the power system frequency.

On the other hand, in the variable speed generator-motor apparatus, when the power system frequency $f_1$ decreases as shown in FIG. 4, even though the rotating speed also decreases by the synchronizing power, since the rotating speed is suppressed to the speed $N_R$ as described above in spite of the power system frequency, both of an increase of the output of the induction machine (or a decrease of the input of the induction machine) and a decrease of the rotating speed do not occur because of a cancellation of the synchronizing power. FIG. 4(b) shows an example that the generator-motor apparatus rotates at a speed lower than the synchronous speed $N_O$.

This is to say that the variable speed generator-motor apparatus does not contribute a suppression of the frequency change of the power system.

A third problem resides in that it is impossible to contribute the suppression of the frequency change of the power system because of none of governor free function.

In the conventional generator-motor apparatus having the synchronous machine, when a control function of the prime mover causes a rotating speed to decrease during generating operation with a decrease of the power system frequency, there is a function so-called a governor free function in which an output of the prime mover changes to suppress the decrease of the rotating speed. The governor free function contributes the suppression of the frequency change in the power system, a governor free function as a first definition is a function that changes an output of the prime mover to suppress the decrease of the rotating speed of the prime mover with such the decrease of the frequency of the power system.

On the other hand, in the conventional variable speed generator-motor apparatus, since the rotating speed does not change even though the power system frequency decreases, an output of the prime mover does not change.

In order to solve the first problem, there is provided a method for correcting active power by an AC excitation control device corresponding to an amount that a detected slip is over a set value (see Japanese Patent Application Laid-open No. 1-231698(1989)).

The method uses the generator-motor apparatus having the induction machine, which further has a slip frequency limit device, as a third conventional example shown in FIG. 3, comprising a slip frequency detector 81 for detecting an excitation frequency $f_2$ (namely, a slip frequency $f_s$) of the induction machine 1 on the basis of a PLL output signal, a slip excess detector 82 for detecting an amount that the slip frequency $f_s$ is over a slip width set value $f_m$, a first order lag calculator 83, and a subtracter 84 for subtracting an output $P_c$ of the first order lag calculator 83 from an active power command value $P^*$ to output a corrected active power command value $P_1^*$.

In this method, since the slip frequency $f_s$ does not largely exceed the slip width set value $f_m$ by the slip frequency limit device 180, it is possible to stably operate the system without an excess of a slip.

However, since the method can not solve the second and third problems, it does not change the conventional method with respect to a suppression of the frequency change in the power system.

In order to solve the third problem, there is provided a method for correcting an output $P^*$ of the active power setter 6 by a detected frequency change in the power system (Japanese Patent Publication No. 3-51910(1991)).

The method uses a generator-motor apparatus, as a fourth example shown in FIG. 6, comprising, in addition to elements shown in FIG. 1, a power system frequency change suppression means including a frequency detector 85, change rate calculator 86, and adder 84. In this method, since the power system frequency change suppression means corrects an active power command value corresponding to a frequency change in the power system, the active power changes as a result in the direction to suppress the frequency change in the power system, thereby contributing a suppression of the frequency change in the power system.

However, the method can not solve the first and second problems, thereby only resulting in an incomplete improvement.

SUMMARY OF THE INVENTION

The first object of the present invention is to provide a variable speed generator-motor apparatus without an operation failure even when a power system frequency largely changes.

The second object of the present invention is to utilize a variable speed generator-motor apparatus without a cancellation of synchronizing force thereby to contribute a suppression of a frequency change in a power system.

The third object of the present invention is to provide a variable speed generator-motor apparatus to which a control function is added for suppressing a frequency change in a power system.

For achieving the above objects, a variable speed generator-motor apparatus according to the present invention comprises a wound-rotor induction generator-motor having a primary winding connected to a power system, a secondary winding excited by an alternating current (AC) and a generator shaft; a prime-mover/load united with the generator shaft; frequency detection means for detecting an AC excitation frequency on the basis of power data including a frequency and a voltage phase in the power system and data of the generator shaft; means for generating a slip frequency command value in the generator-motor; and frequency control means for controlling the generator-motor in the manner that the AC excitation frequency is set to the slip frequency command value.

In order to achieve the first and second objects, a first aspect of the present invention is to provide a variable speed generator-motor apparatus comprising a wound-rotor induction generator-motor having a primary winding connected to a power system and a secondary winding excited by an alternating current; a prime-mover/load united to a generator shaft of the wound-rotor induction generator-motor; frequency detection means for detecting a frequency of an AC excitation on the basis of any of frequency and voltage phase of the power system and any of rotating speed and rotating angle of the generator shaft; and slip frequency control means for controlling the wound-rotor induction generator-motor in the manner that the frequency of the AC excitation becomes to a slip frequency command value.

In order to achieve the first object, a second aspect of the present invention is to provide a variable speed generator-motor apparatus further comprising means for limiting within a reference value a slip frequency command value outputted from the slip frequency control means in addition to the apparatus of the first aspect.

In order to achieve the second and third object, a third aspect of the present invention is to provide a variable speed generator-motor apparatus comprising a wound-rotor induction generator-motor having a primary winding connected to a power system and a secondary winding excited by an alternating current; a prime-mover/load united to a generator shaft of the wound-rotor induction generator-motor; frequency detection means for detecting a frequency of an AC excitation on the basis of any of frequency and voltage phase of the power system and any of rotating speed and rotating angle of the generator shaft; and slip frequency control means for controlling the wound-rotor induction generator-motor in the manner that the frequency of the AC excitation becomes to a slip frequency command value.

In order to achieve the second and third objects, a fourth aspect of the present invention is to provide a variable speed generator-motor apparatus comprising a wound-rotor induction generator-motor having a primary winding connected to a power system and a secondary winding excited by an alternating current; a prime-mover/load united to a generator shaft of the wound-rotor induction generator-motor; frequency detection means for detecting a frequency of an AC excitation on the basis of any of frequency and voltage phase of the power system and any of rotating speed and rotating angle of the generator shaft; slip frequency control means for controlling the wound-rotor induction generator-motor in the manner that the frequency of the AC excitation becomes to a slip frequency command value; and prime-mover/load torque correction means for correcting a torque of the prime-mover/load corresponding to a frequency change in the power system.

In order to achieve the second and third objects, a fifth aspect of the present invention is to provide a variable speed generator-motor apparatus comprising a wound-rotor type induction generator-motor having a primary winding connected to a power system and a secondary winding excited by an alternating current; a prime-mover/load united to a generator shaft of the wound-rotor induction generator-motor; frequency detection means for detecting a frequency of an AC excitation on the basis of any of frequency and voltage phase of the power system and any of rotating speed and rotating angle of the generator shaft; slip frequency control means for controlling the wound-rotor induction generator-motor in the manner that the frequency of the AC excitation becomes to a slip frequency command value; and slip frequency command value correction means for correcting the slip frequency command value corresponding to the rotating speed of the generator shaft.

In order to achieve the second and third objects, a sixth aspect of the present invention is to provide a variable speed generator-motor apparatus comprising a wound-rotor induction generator-motor having a primary winding connected to a power system and a secondary winding excited by an alternating current; a prime-mover/load united to a generator shaft of the wound-rotor induction generator-motor; frequency detection means for detecting a frequency of an AC excitation on the basis of any of frequency and voltage phase of the power system and any of rotating speed and rotating angle of the generator shaft; slip frequency control means for controlling the wound-rotor induction generator-motor in the manner that the frequency of the AC excitation becomes to a slip frequency command value; and slip frequency command value correction means for correcting the slip frequency command value corresponding to a frequency change in the power system.

There is described a function of the variable speed generator-motor apparatus constituted in the first aspect. Since the generator-motor apparatus comprises the slip frequency control means, the slip frequency $f_s$, namely "$f_1-f_R$", is controlled to be constant, thereby resulting in a numerator of the equation (1) to be constant. Accordingly, even though the frequency in the power system changes, the slip does not change. For example, when $f_1$ is 100% and $f_R$ is 95% to cause the slip S to be 5%, even though $f_1$ changes to be 105%, $f_R$ is controlled to be 100% because $f_S$ is constant, thereby resulting in a small change of the slip S because of only changing the slip S from 5% to 4.76%.

As described above, when the frequency in the power system changes, the rotating speed changes with the same rate of the frequency change in the power system in order to prevent the change of the slip frequency. The change is equal to a change of the rotating speed of the induction machine by synchronizing power, and means that the variable speed generator-motor does not cancel synchronizing power.

There is described a function of the variable speed generator-motor apparatus constituted in the second aspect. Since the apparatus according to the second aspect comprises the means for limiting the slip frequency command value within the reference value, the slip is limited within the reference value as described above even though the frequency in the power system changes.

There is described a function of the variable speed generator-motor apparatus constituted in the third aspect. When the apparatus according to the third aspect corrects a torque of the prime-mover/load with $\Delta\tau_M$ in proportion to a change $\Delta N$ of the rotating speed, a correction amount $\Delta\tau_M$ is proportional to a change amount of the frequency $f_1$ in the power system to correct the active power of the induction machine 1 with $\Delta\tau_M$, because the slip frequency constantly controls the frequency $f_2$. Accordingly, the apparatus using the means of the third aspect shows a governor free function that causes the torque of the primemover/load and the active power of induction machine 1 to change corresponding to the change of the frequency $f_1$ of the power system.

There is described a function of the variable speed generator-motor apparatus according to the fourth aspect of the present invention. Since the apparatus of the fourth aspect corrects the torque of the prime-mover/load and the active power of the induction machine 1 corresponding to the frequency change in the power system, the apparatus of the fourth aspect shows a governor free function in the same manner of the third aspect.

There is described a function of the variable speed generator-motor apparatus according to the fifth aspect of the present invention. The apparatus of the fifth aspect corrects the slip frequency command value $f_s^*$ by a value of which the frequency change $\Delta f_1$ of the power system is integrated. Since the slip frequency control corrects the frequency $f_2$ to coincide with the slip frequency command value $f_s^*$, a correction amount $\Delta P_E$ of the active power of the induction machine 1 is a value corresponding to the frequency change $\Delta f_1$ in the power system. The correction amount $\Delta P_E$ of the active power changes with a correction of the slip frequency command value $f_2^*$ as will be mentioned later.

There is described a function of the variable speed generator-motor apparatus constituted in the sixth aspect. The apparatus according to the sixth aspect of the present invention corrects the slip frequency command value $f_s^*$ corresponding to a difference $\Delta f_1$ between the power system frequency and the reference frequency. Since the slip frequency controls the frequency $f_2$ to coincide with the slip frequency command value $f_s^*$, a correction amount $\Delta P_E$ of the active power of the induction machine 1 is a value corresponding to the frequency change $\Delta f_1$ in the power system. The correction amount $\Delta P_E$ of the active power changes with a correction of the slip frequency command value $f_2^*$ as will be mentioned later.

Accordingly, since a slip change is suppressed and can correspond to a frequency change in a power system without a cancellation of synchronizing power when the power system frequency largely changes, and since active power is caused to be changed in the direction of suppressing the frequency change in the power system, operation failure does not occur even when the power system frequency largely changes, thereby contributing a suppression of a frequency change in a power system.

BRIEF DESCRIPTION OF THE DRAWINGS

In the accompanying drawings:

FIG. 3 is a characteristic diagram showing operation of the conventional generator-motor apparatus using the synchronous machine;

FIG. 9 is a block diagram showing an example of a PLL circuit installed in the variable speed generator-motor apparatus shown in FIG. 8;

FIG. 10 is a block diagram showing a slip frequency command value generation circuit installed in the variable speed generator-motor apparatus shown in FIG. 8;

FIG. 13 is a block diagram showing a constitution of a variable speed generator-motor apparatus according to a third embodiment relevant to the second aspect of the present invention;

DETAILED DESCRIPTION OF THE PREFERRED EMBODIMENTS

There will be described in detail preferred embodiments of a variable speed generator-motor apparatus according to the present invention with reference to the attached drawings.

Figure 7:
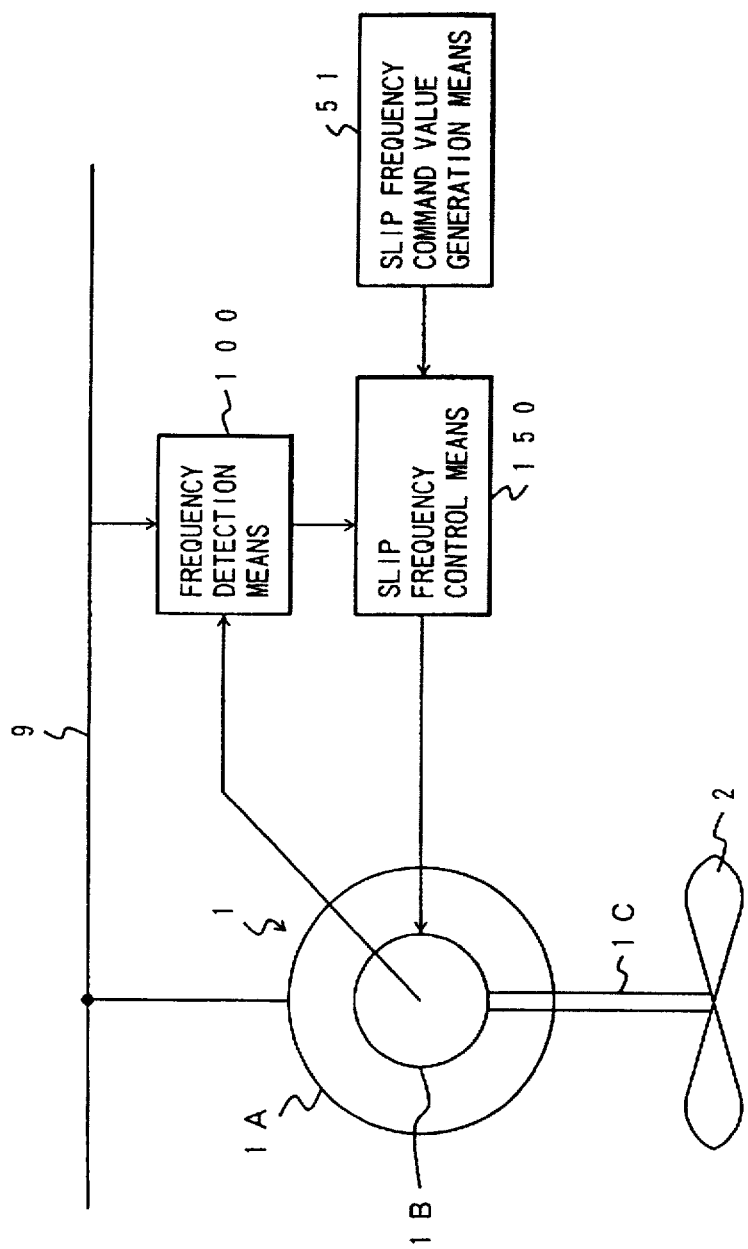
FIG. 7 is a block diagram showing fundamental concept of a variable speed generator-motor apparatus according to the present invention.

Before the description of embodiments, there is described a fundamental concept of the variable speed generator-motor apparatus according to the present invention with reference to FIG. 7. In FIG. 7, the generator-motor apparatus comprises a wound-rotor induction generator-motor 1 including a primary winding 1A connected to a power system 9, a secondary winding 1B excited by an alternating current (AC), and a generator shaft 1C; a prime-mover/load 2 united to the generator shaft 1C; frequency detection means 100 for detecting an AC excitation frequency on the basis of power data in the power system 9 and the data of the generator shaft 1C; slip frequency command value generation means 51 for generating a slip frequency command value of the generator-motor 1; and slip frequency control means 150 for controlling the generator-motor 1 in the manner that the AC excitation frequency outputted from the frequency detection means 100 coincides with the slip frequency command value outputted from the means 51.

In the following description, all of variables and constants are values added with non-dimension processing by respective reference values.

Figure 8:
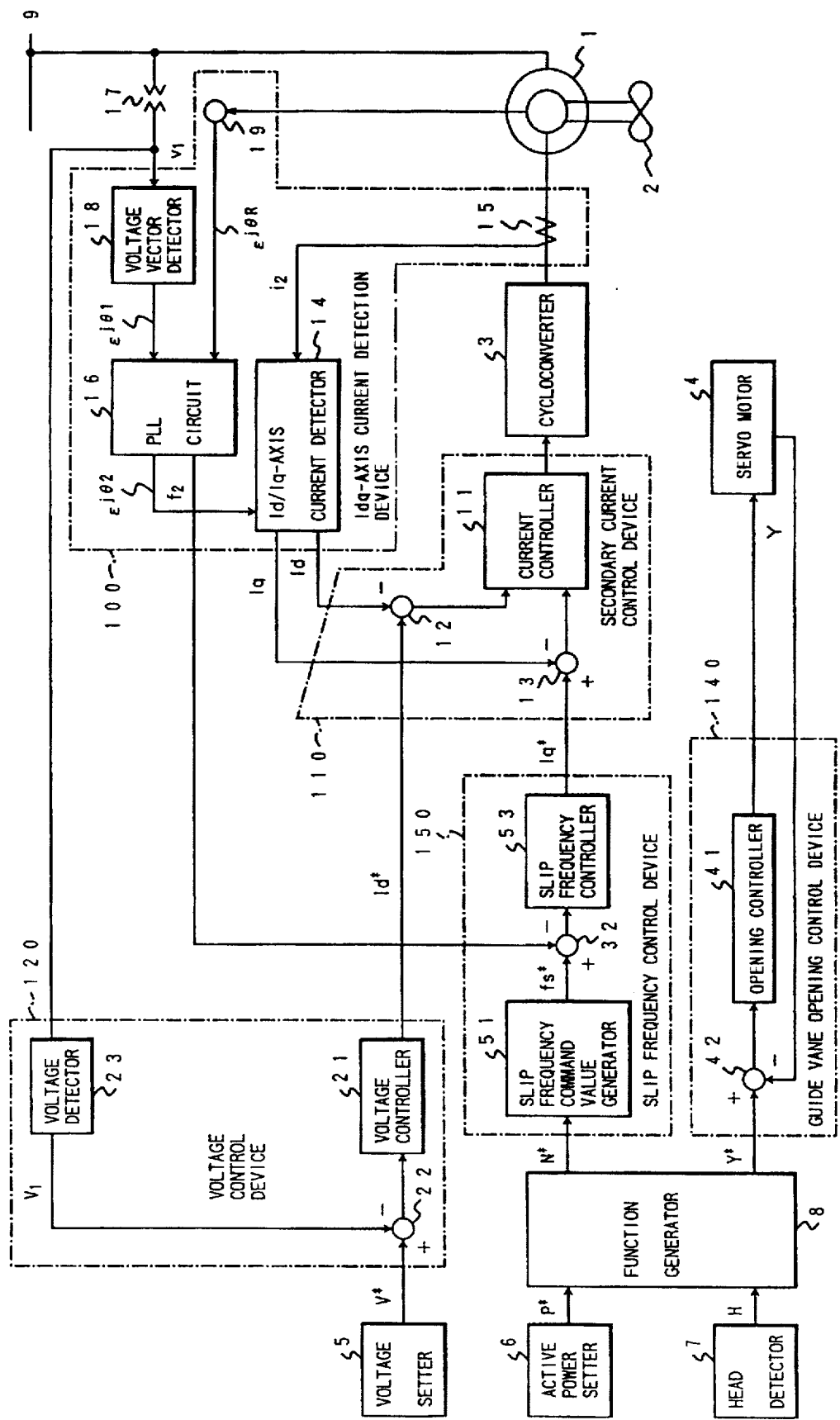
FIG. 8 is a block diagram showing a constitution of a variable speed generator-motor apparatus according to a first embodiment relevant to the first aspect of the present invention.

There is described a variable speed generator-motor apparatus according to a first embodiment relevant to the first aspect of the present invention with reference to FIG. 8 showing a constitution of the first embodiment.

Figure 1:
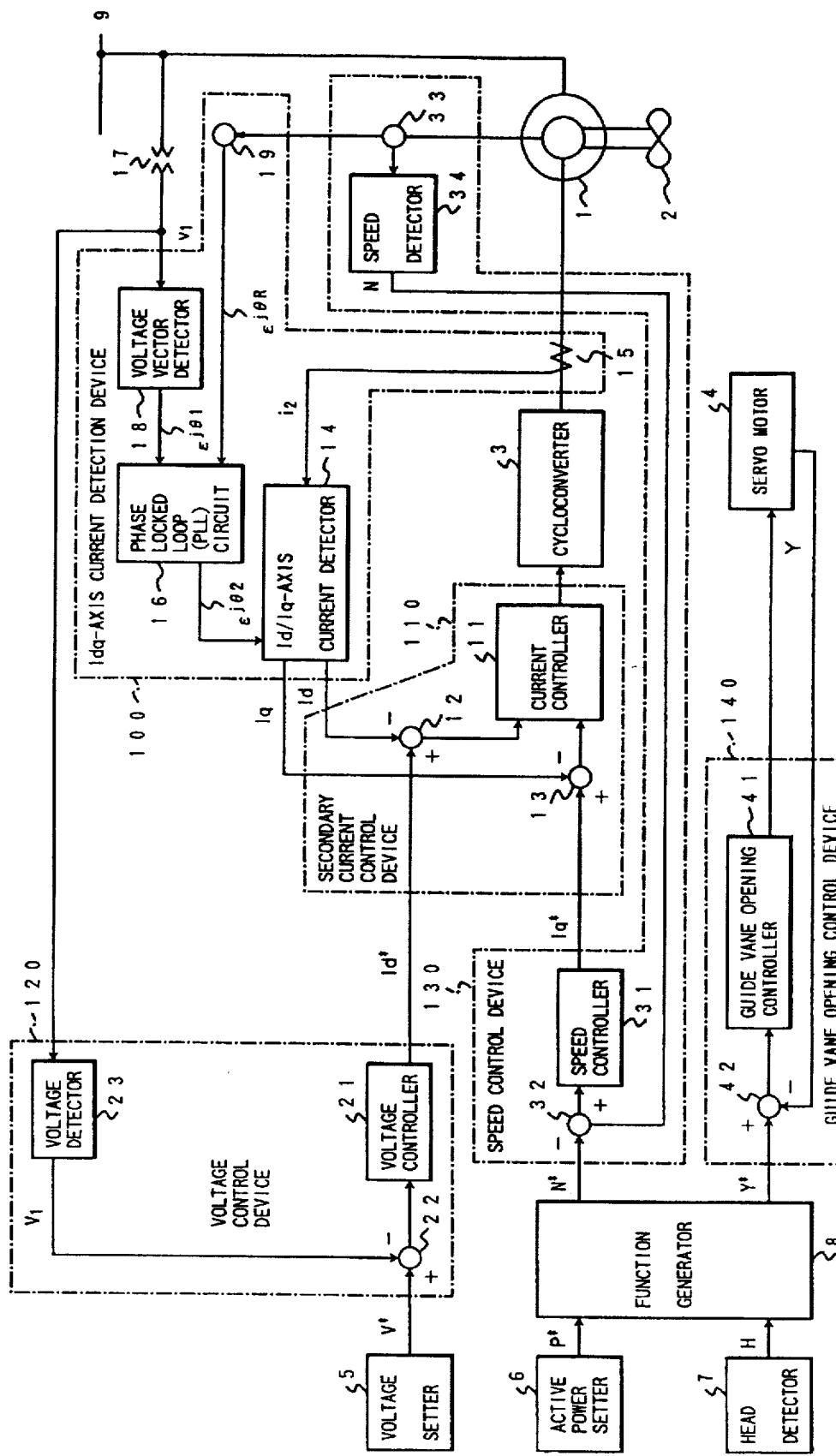
FIG. 1 is a block diagram showing a conventional variable speed generator-motor apparatus according to the first example.
Figure 2:
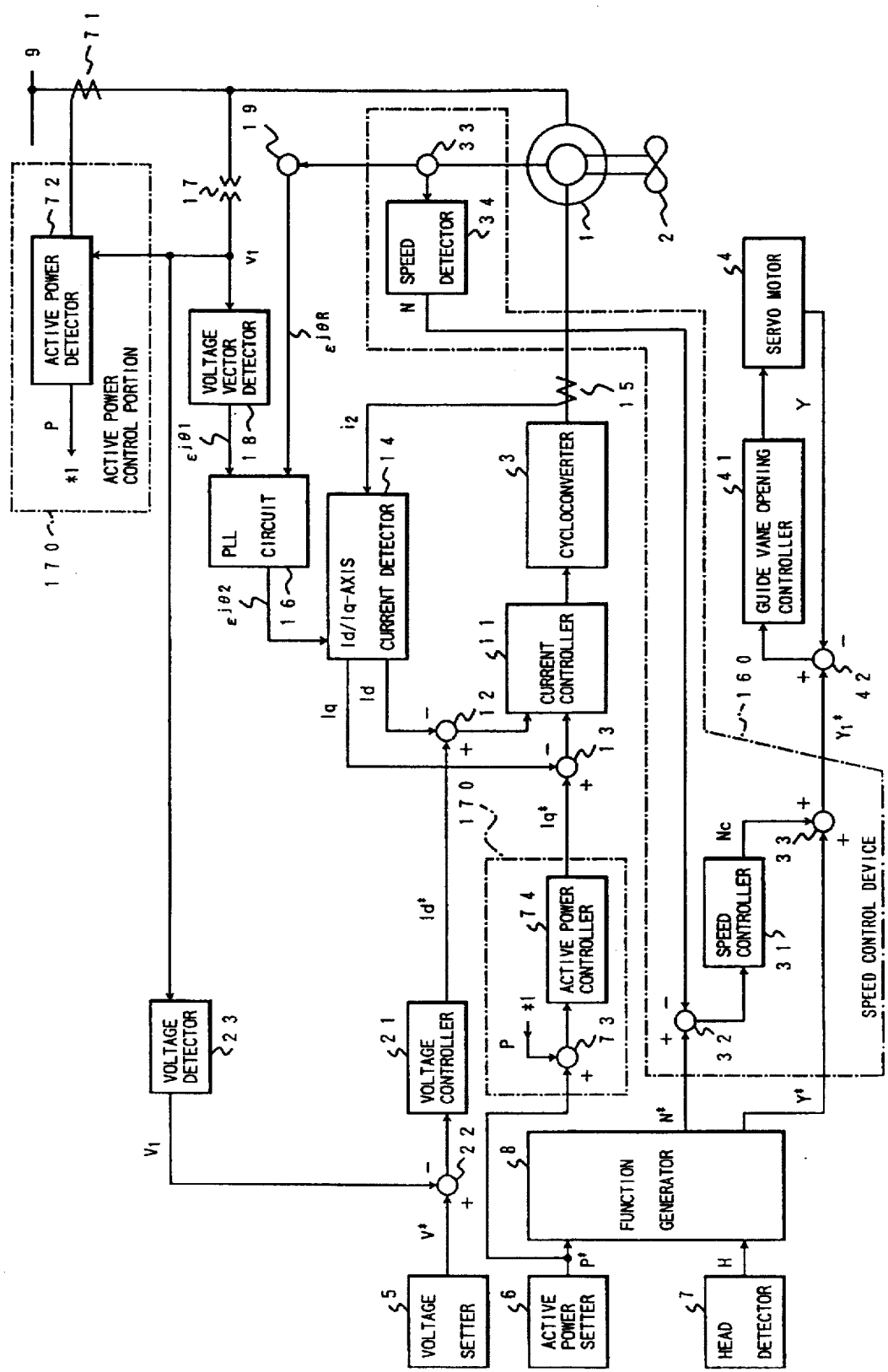
FIG. 2 is a block diagram showing a conventional variable speed generator-motor apparatus according to the second example.
Figure 4:
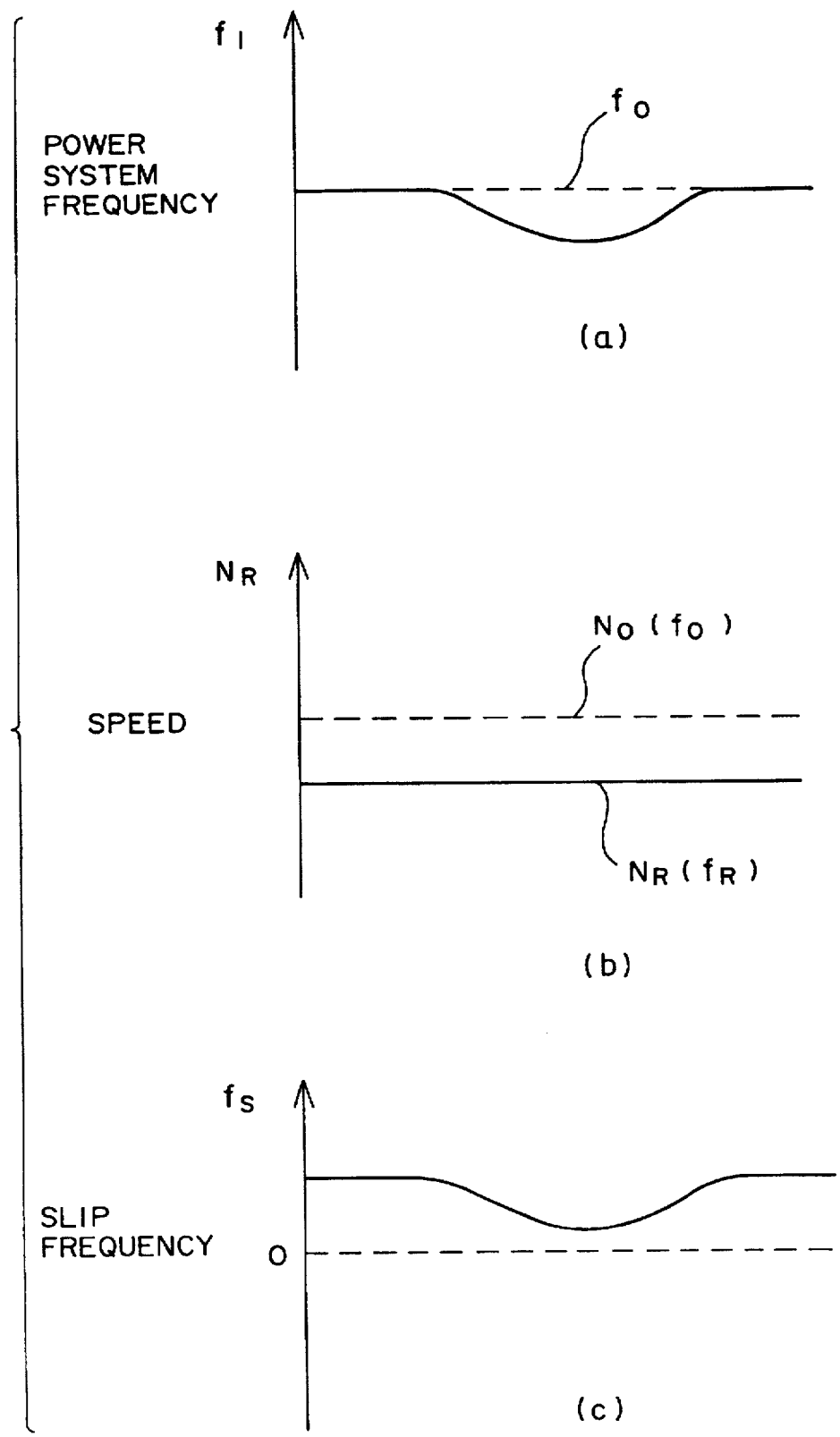
FIG. 4 is a characteristic diagram showing operation of the conventional variable speed generator-motor apparatus.
Figure 5:
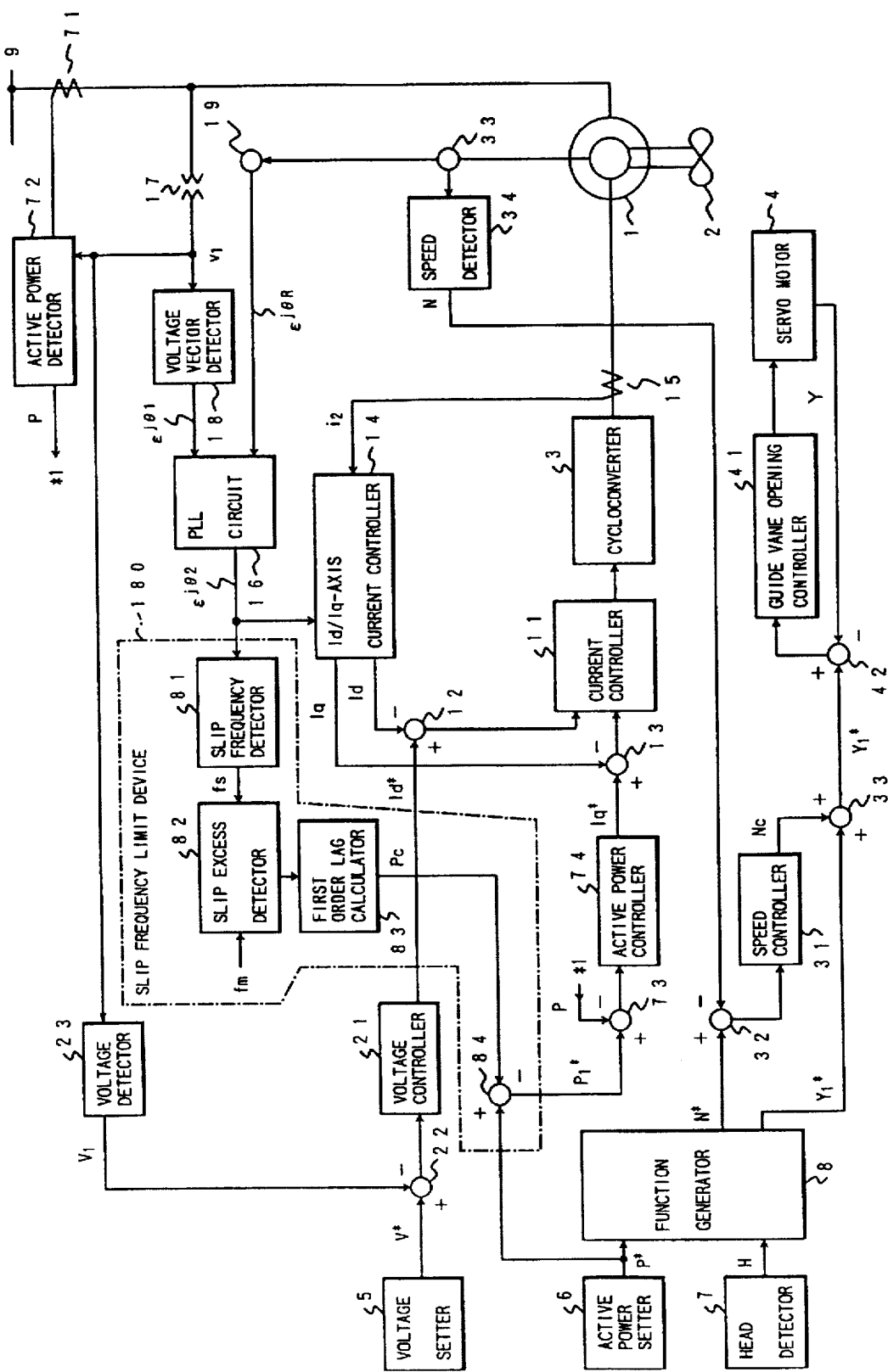
FIG. 5 is a block diagram showing a conventional variable speed generator-motor apparatus according to the third example.
Figure 6:
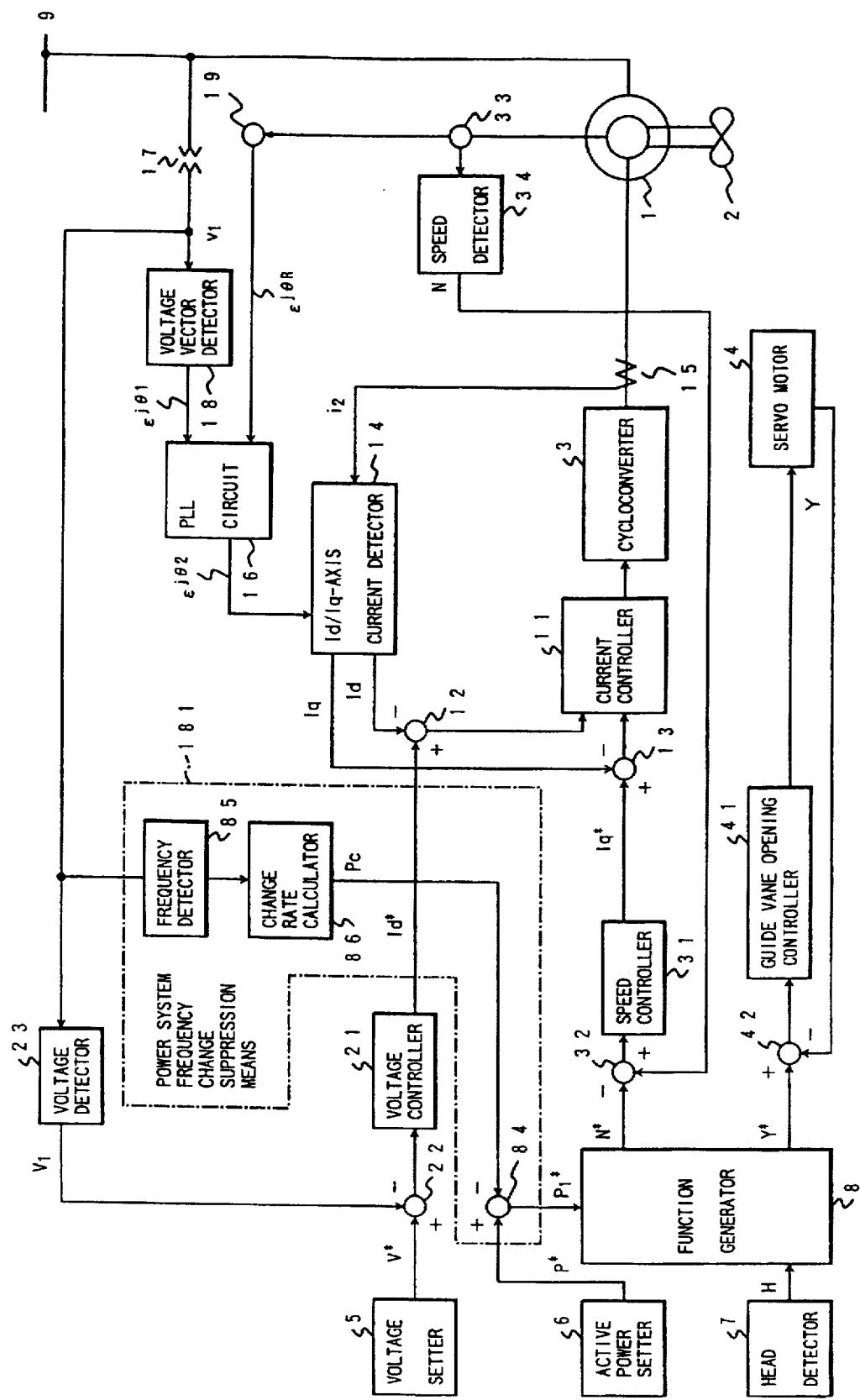
FIG. 6 is a block diagram showing a conventional variable speed generator-motor apparatus according to the fourth example.

Since an entire configuration of the apparatus in FIG. 8 is the same as the conventional apparatus shown in FIG. 1, the duplicated description will be omitted. Accordingly, the generator-motor apparatus comprises an induction machine 1, a pumped turbine 2, a cycloconverter 3, an active power setter 6, a head detector 7, a function generator 8, a servo motor 4, a guide vane opening control device 140 including a guide vane opening controller 41 and subtracter 42, a voltage setter 5, a voltage transformer 17, a voltage control device 120 including a voltage controller 21, subtracter 22 and voltage detector 23, an Idq axis current detecting device 100 including an $I_d/I_q$-axis current detector 14, current detector 15, PLL circuit 16, voltage transformer 17, system frequency phase detector 18 and rotor phase detector 19, and a secondary current control device 110 including a current controller 11 and subtracter 12.

The PLL circuit 16 as an example comprises, as shown in FIG. 9, a vector subtracter 161 for obtaining a difference $e^{j\theta}$ and $e^{j(\theta_R-\theta_2)}$, a proportion and integral calculator 162, a vector generator 163, and a vector adder 164.

The secondary current control device 110 comprises a subtracter 12 for calculating a difference between a d-axis current command value $I_d^*$ and a d-axis current $I_d$, a subtracter 13 for calculating a difference between a q-axis current command value $I_q^*$ and a q-axis current $I_q$, and a current controller 11, thereby controlling an arc angle of the cycloconverter in the manner that the d-axis current $I_d$ coincides with the d-axis current $I_d$ with the d-axis current command value $I_d^*$, and the q-axis current $I_q$ coincides with the q-axis current command value $I_q^*$.

Since the variable speed pumped-storage generator system shown in FIG. 8 operates to make a condition that there is $V=V^*$, $N_R=N^*$, $Y=Y^*$, $I_d=I_d^*$, and $I_q=I_q^*$, it is possible to realize optimum operation (namely, the rotating speed is $N^*$ and the guide vane opening degree is $Y^*$) with the active power set value $P_R$ and the head H under the voltage is $V^*$.

Furthermore, when the system operates under the condition of $I_d=I_d^*$ and $I_q=I_q^*$ it is possible to describe by the following reason that the secondary winding of the induction machine 1 is excited by an alternating current having a frequency of the difference between the power system frequency $f_1$ and the frequency $f_R$ corresponding to the rotating speed $N_R$. Here, words of "corresponding to" mean a relationship between a frequency and a rotating speed, the relationship which is determined in a simple meaning by a determination of a number of polar in the induction machine 1.

Under the condition of $I_d=I_d^*$ and $I_q=I_q^*$, if there is "$\tan\phi^*=I_q^*/I_d^*$, a secondary current $i_2$ can be obtained by the following equation (2):

$$i_2 = \sqrt{(I_d^{*2} + I_q^{*2})} \epsilon \cdot j(\theta_2 + \phi^*) \qquad (2)$$

A frequency $f_2$ of the current $i_2$ is obtained by differentiating a phase angle $(\theta_2+\phi^*)$ of the current $i_2$. Since there is "$\theta_2=\theta_1-\theta_R$" and $\phi^*$ is a constant value, the frequency $f_2$ is "$f_2=d(\theta_2+\phi^*)/dt=d(\theta_1-\theta_R)/dt$". Since $\theta_1$ and $\theta_R$ are to be $f_1$ and $f_R$ by a differentiation, $f_2$ can be obtained by the following equation (3):

$$f_2 = f_1 - f_R \qquad (3)$$

It can be understood that the excitation frequency $f_2$ of the induction machine 1 becomes equal to the slip frequency $f_S$ (where $f_S=f_1-f_R$).

The generator-motor apparatus according to the first embodiment shown in FIG. 8 is different from the conventional apparatus at the point of provision of a slip frequency control device 150 in the place of the speed control device 130. The slip frequency control device 150 comprises a slip frequency command value generator 51 for calculating a slip frequency command value $f_S^*$, a subtracter 52 for calculating a difference between the slip frequency command value $f_S^*$ and an internal output $f_2$ of the PLL circuit 16, and a slip frequency controller 53 for outputting a q-axis current command value $I_q^*$ on the basis of the difference calculated by the subtracter 52.

The slip frequency command value generator 51 comprises a subtracter 511 and a coefficient multiplier 512 as shown in FIG. 10, and a calculation content is a value corresponding to the following equation (4):

$$f_S^* = N_0 - N^* \qquad (4)$$

where, $N_0$ is a reference synchronous speed and means a rotating speed corresponding to a reference frequency value $f_0$ of the power system frequency $f_1$.

Next, there is described a function of the apparatus according to the first embodiment.

Since the internal output $f_2$ of the PLL circuit 16 is the excitation frequency of the induction machine 1, even though $f_2$ is represented by the equation (3) as described above, $f_2$ can also be represented by the rotating speed in the following equation (5):

$$f_2 = N_1 - N_R \qquad (5)$$

Since the slip frequency controller 53 controls operation to be $f_S^*=f_2$, an equation (6) can be established from the equations (4) and (5) as follows:

$$N_R = N^* + N_1 - N_0 \qquad (6)$$

As understood from the equation (6), the rotating speed $N_R$ is controlled to be "$N^*+N_1-N_0$".

Furthermore, the slip frequency $f_S$ is controlled with no relation of the power system frequency $f_1$, as shown in the equation (4).

Figure 11A:
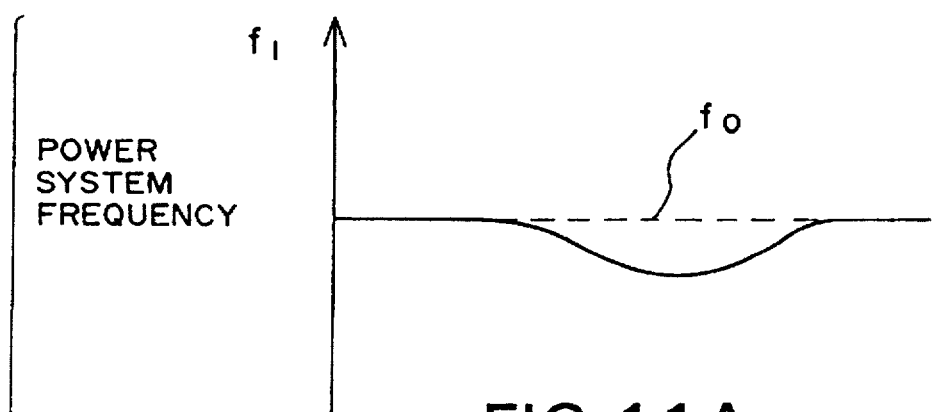
FIGS. 11a, 11b, and 11c are characteristic diagrams showing operation of the variable speed generator-motor apparatus according to the present invention.
Figure 11B:
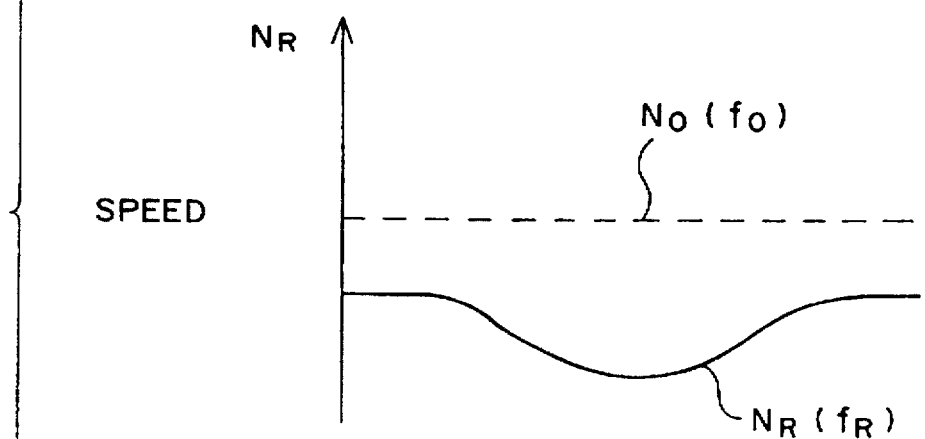
Figure 11C:
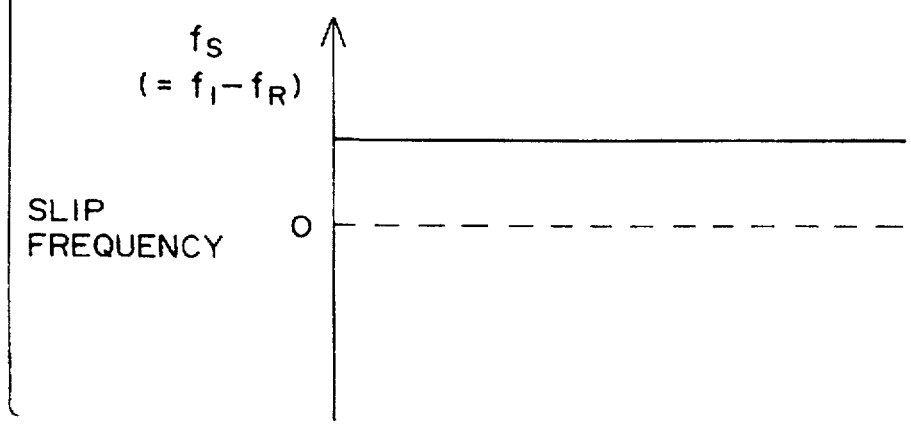

Even though the rotating speed changes in the same rate with a frequency change of the power system (see the equation (6)) for preventing the slip frequency from a change when the power system frequency changes, since this change is equal to a change of the rotating speed by synchronizing power, it means that the apparatus is a variable speed generator-motor apparatus without a cancellation of synchronizing power. These operations are shown in FIGS. 11a, 11b, and 11c, where the generator-motor apparatus rotates at a speed lower than the synchronous speed $N_O$.

Accordingly, in the first embodiment, the rotating speed of the variable speed generator-motor apparatus is controlled to be "$N^*+N_1-N_0$". Since $N^*$ is enough to be large against "$N_1 N_0$", it is possible to operate the apparatus near the optimum rotating speed $N^*$, thereby changing the rotating speed from $N^*$ to "$N_1-N_0$" corresponding to the frequency change of the power system.

As described above, the change of the rotating speed corresponding to the frequency change of the power system means that synchronizing power is not cancelled, thereby contributing the suppression of the frequency change in the power system.

Even though the apparatus of the first embodiment uses the pumped turbine as the prime-mover/load, it is possible to obtain the same effect of the first embodiment by using a rotational body having inertia such as a reversible pump turbine, pump, steam turbine, flywheel, and wind mill.

When an internal output can not be obtained because the PLL circuit is integrated, it is possible to result the same function and effect by adopting another method for detecting the slip frequency such as a second embodiment. There will be described a variable speed generator-motor apparatus according to the second embodiment of the present invention as another example of the slip frequency detection method with reference to FIG. 12.

The apparatus according to the present invention can obtain the same effect by means of a detection of a slip frequency $f_S$ as "$f_1-N_R$" on the basis of the power system frequency $f_1$ and the rotating speed $N_R$ in the place of an internal detection of the slip frequency in the PLL circuit.

Figure 12:
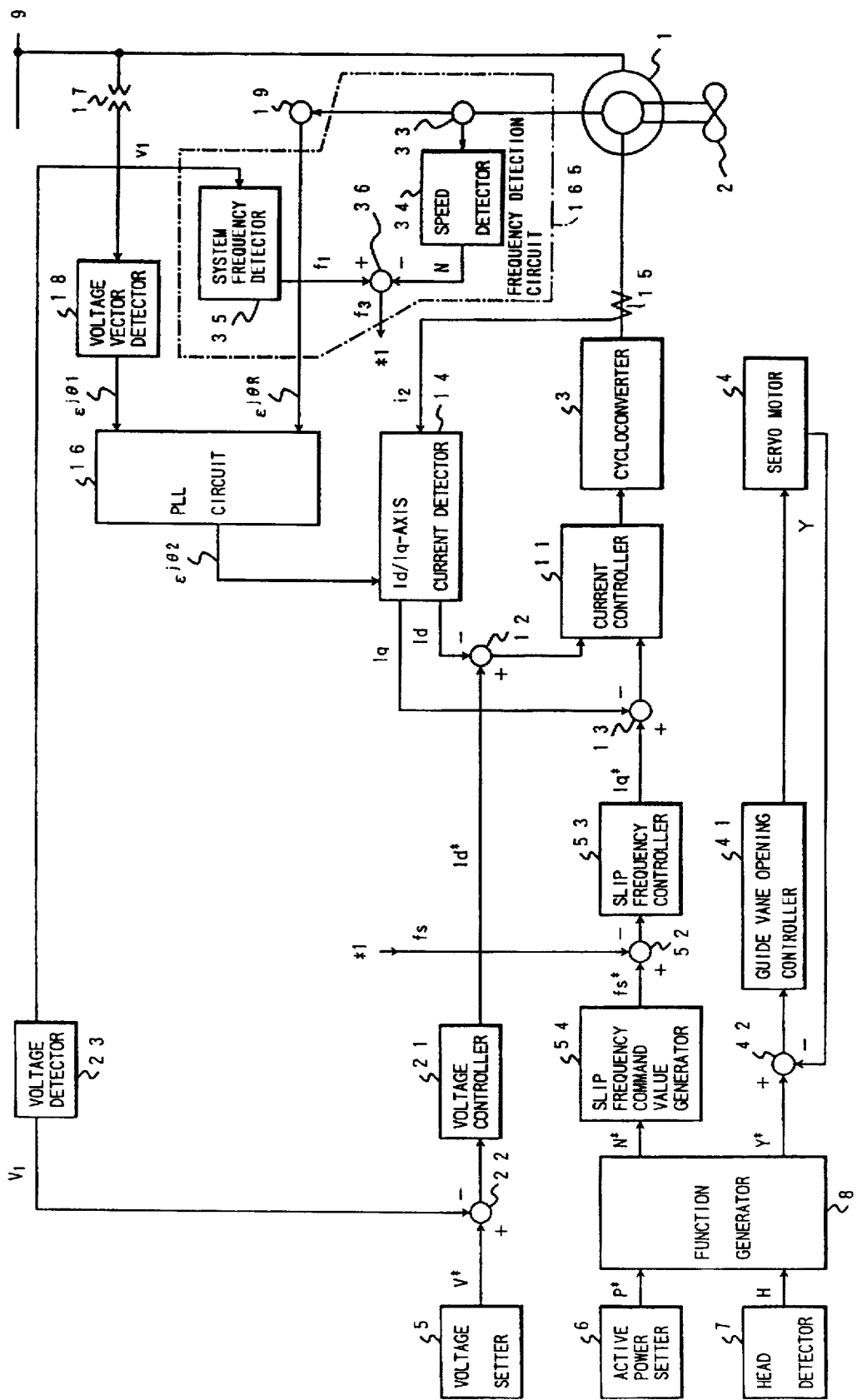
FIG. 12 is a block diagram showing a constitution of a variable speed generator-motor apparatus according to a second embodiment relevant to the first aspect of the present invention.

FIG. 12 shows another constitution of the slip frequency detection circuit. The frequency detection circuit 165 in FIG. 12 is added to the apparatus in FIG. 12 and comprises a speed signal detector 33, speed detector 34, system frequency detector 35 and subtracter 36. The apparatus according to the second embodiment has a difference to use an output signal $f_S$ of the subtracter 36 in the place of the output signal $f_2$ of the PLL circuit shown in FIG. 8. Since function and effect are the same as the first embodiment shown in FIG. 8, a duplicated description is omitted.

In the same manner, it is possible to detect the slip frequency by a detection of the frequency of the secondary current phase reference $\epsilon$ as other output signal of the PLL circuit. Since an example of the detection is disclosed in the frequency/voltage transformer 81 shown in the fourth example of the prior art, the duplicated description is omitted.

Although the above description relates to only one example of the method for detecting the slip frequency, any more methods for detecting the slip frequency may be applied to the present invention to obtain the above function and effect.

Next, there is described a variable speed generator-motor apparatus according to a third embodiment corresponding to the second aspect of the present invention with reference to the figure.

The apparatus of the third embodiment changes the slip frequency command value generator 51 of the first embodiment shown in FIG. 10 to a constitution shown in FIG. 13, namely, a limiter 513 is added to an output of the coefficient multiplier 512.

Function is described in the third embodiment. Since the slip frequency command value fS* is limited to the reference value in the third embodiment, the excitation frequency $f_2$ (namely, the slip frequency $f_S$) is not over the reference value because of being controlled to be $f_S^*$.

Accordingly, since the slip frequency in the third embodiment is not over the reference value, the slip is not over the reference value either. Therefore, operation failure does not occur even when the power system frequency largely changes, thereby maintaining stable operation.

Figure 14:
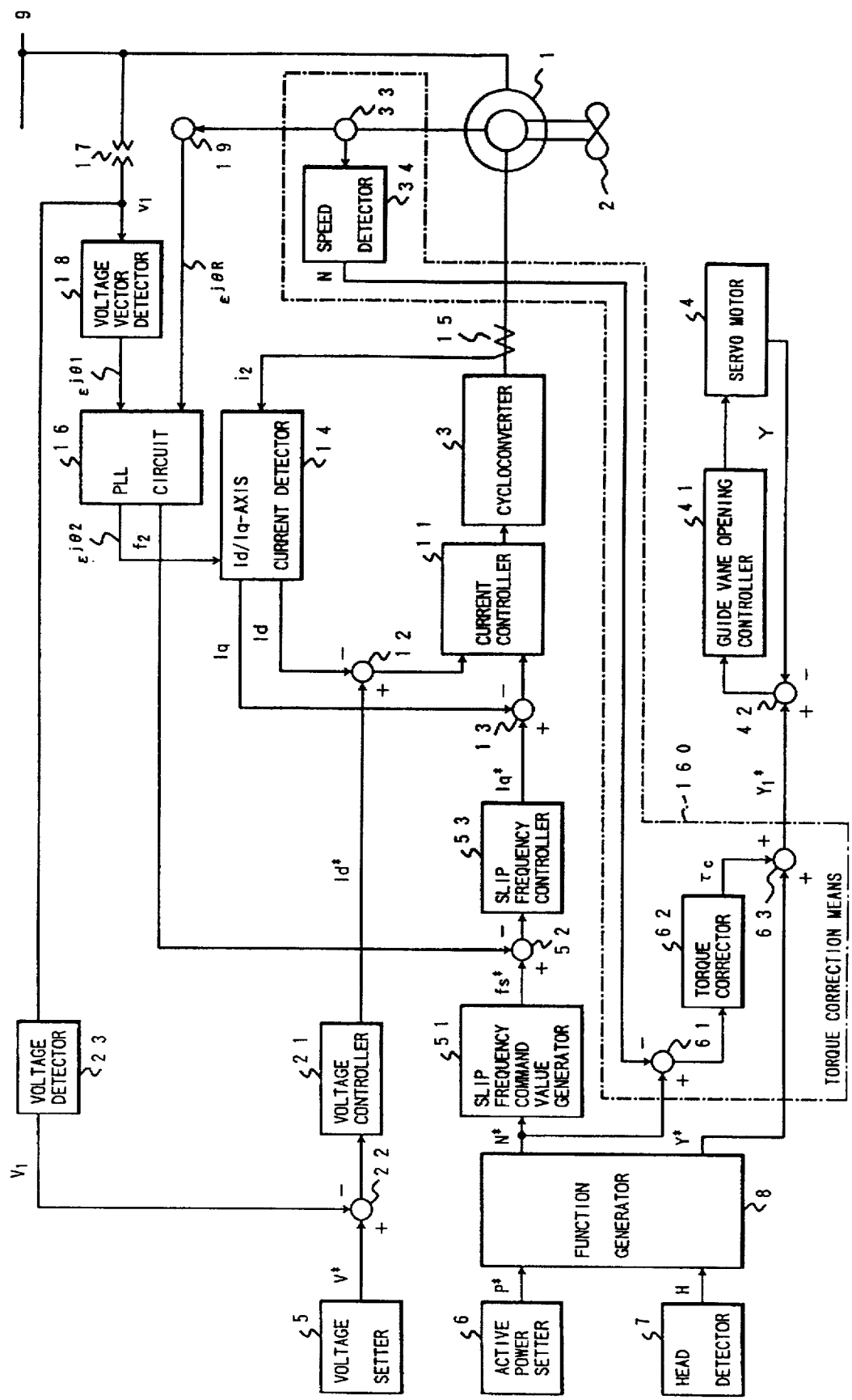
FIG. 14 is a block diagram showing a constitution of a variable speed generator-motor apparatus according to a fourth embodiment relevant to the third aspect of the present invention.

There is described a variable speed generator-motor apparatus according to a fourth embodiment corresponding to the third aspect of the present invention with reference to attached drawing. FIG. 14 shows a constitution of the apparatus according to the fourth embodiment.

The apparatus shown in FIG. 14 comprises rotating speed detection means having a speed signal detector 33 and speed detector 34, and torque correction means 160 in addition to the constitution shown in FIG. 8. The torque correction means 160 comprises a subtracter 61 for calculating a difference between a speed command value N* and a rotating speed N, a torque corrector 62 for calculating a signal $\tau_c$ to correct a guide vane opening command value Y* on the basis of an output of the subtracter 61, and an adder 63 for adding the correction signal $\tau_c$ with the guide vane opening command value Y*.

Function of the fourth embodiment is described below. In the fourth embodiment, the correction signal $\tau_c$ can be obtained by a following equation (7):

$$\tau_c = K(N^* - N_R) \tag{7}$$

where symbol K is a speed regulation.

Since the equation (6) can be established by a slip frequency control, the following equation (8) represents an amount $\Delta\tau_M$ of which a torque of the prime-mover/load is corrected by the correction signal $\tau_c$:

$$\Delta\tau_M = \tau_c = -K(N_1 - N_0) = -K(f_1 - f_0) \tag{8}$$

When the torque of the prime-mover/load is corrected with $\Delta\tau_M$, even though the rotating speed and slip of the induction machine 1 change, the slip frequency control corrects active power in the induction machine 1 with the amount $\Delta\tau_M$ to suppress a change in the slip. Therefore, the active power in the induction machine 1 is corrected corresponding to the frequency change $(f_1-f_0)$ in the power system.

Accordingly, since the apparatus of the fourth embodiment can exhibits so-called governor free function for changing torque of the prime-mover/load and active power in the induction machine 1, it is possible to contribute more and more suppression of the frequency change in the power system.

Figure 15:
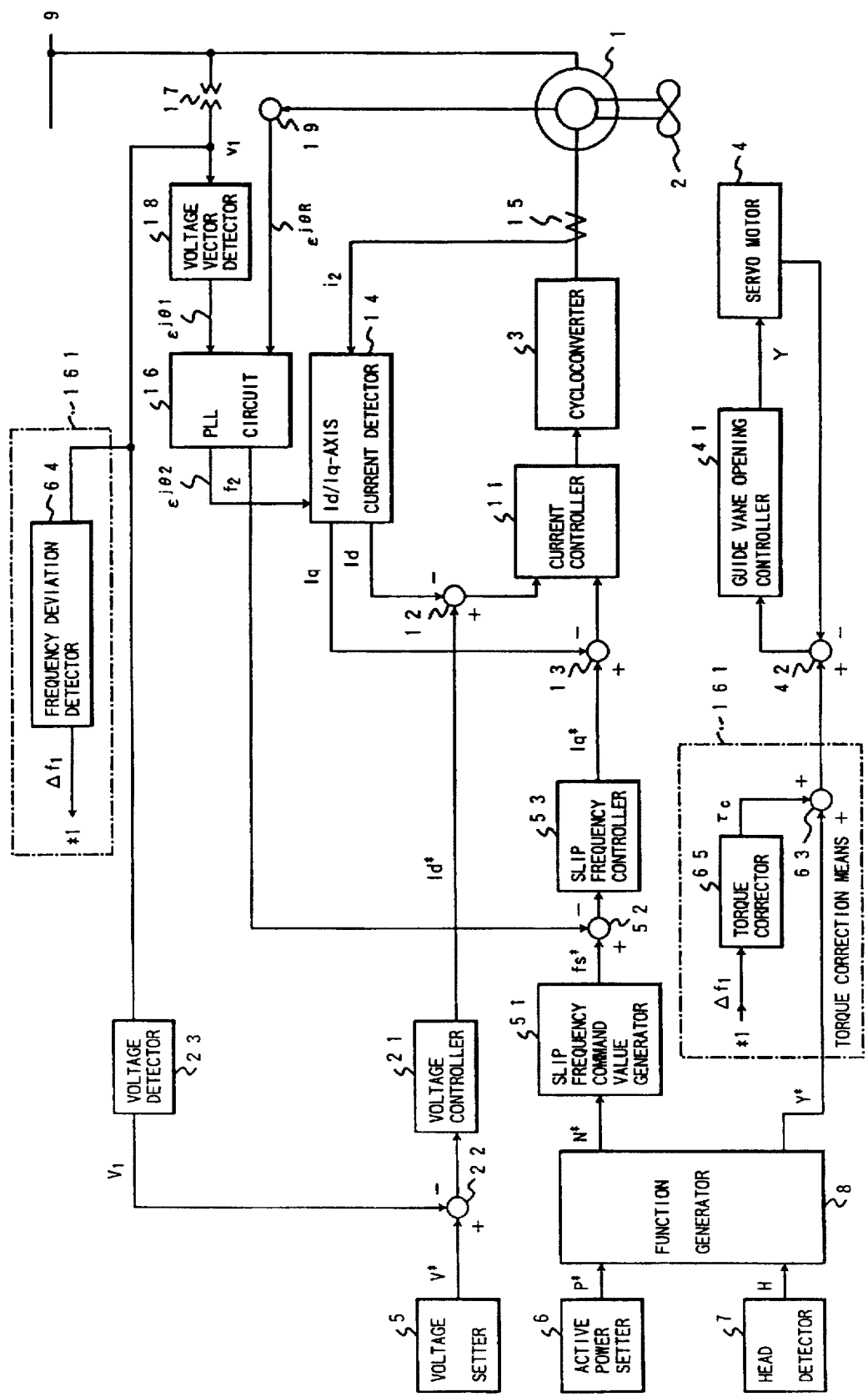
FIG. 15 is a block diagram showing a constitution of a variable speed generator-motor apparatus according to a fifth embodiment relevant to the fourth aspect of the present invention.

There is described a variable speed generator-motor apparatus according to a fifth embodiment corresponding to the fourth aspect of the present invention with reference to attached drawings. FIG. 15 shows a constitution of the apparatus of the fifth embodiment.

In FIG. 15, the apparatus according to the fifth embodiment comprises torque correction means 161 in addition to the constitution shown in FIG. 8. The torque correction means 161 comprises a frequency deviation detector 64 for detecting deviation $\Delta f_1$ between the power system frequency and the reference frequency, a torque corrector 65 for calculating the correction signal $\tau_c$ for correcting the guide vane opening command value Y* on the basis of the deviation $\Delta f_1$, and an adder 63 for adding the correction signal $\tau_c$ with the guide vane opening degree command value Y*.

Next, there is described function of the apparatus according to the fifth embodiment.

In the fifth embodiment, the correction signal $\tau_c$ is obtained by an equation (9) as follows:

$$\tau_c = -K_F \Delta f_1 \tag{9}$$

where $K_F$ is a frequency regulation.

If an amount corrected from the prime-mover/load by the correction signal $\tau_c$ is $\Delta\tau_M$, the amount $\Delta\tau_M$ can represented by the following equation (10):

$$\Delta\tau_M = \tau_c = -K_F \Delta f_1 \tag{10}$$

as described above, active power of the induction machine 1 is corrected with $\Delta\tau_M$ by means of slip control. The variable speed generator-motor apparatus including the means of the fourth aspect has the so-called governor free function which changes torque of the prime-mover/load and active power in the induction machine 1 corresponding to a change $\Delta f_1$ of the power system frequency $f_1$.

Accordingly, since the fifth embodiment has a specific effect for exhibiting a governor free function which changes torque of the prime-mover/load and active power of the induction machine 1 corresponding to the frequency change of the power system in addition to the specific effect of the first and second embodiments corresponding to the first aspect, it is possible to contribute a suppression of the frequency change of the power system.

Figure 16:
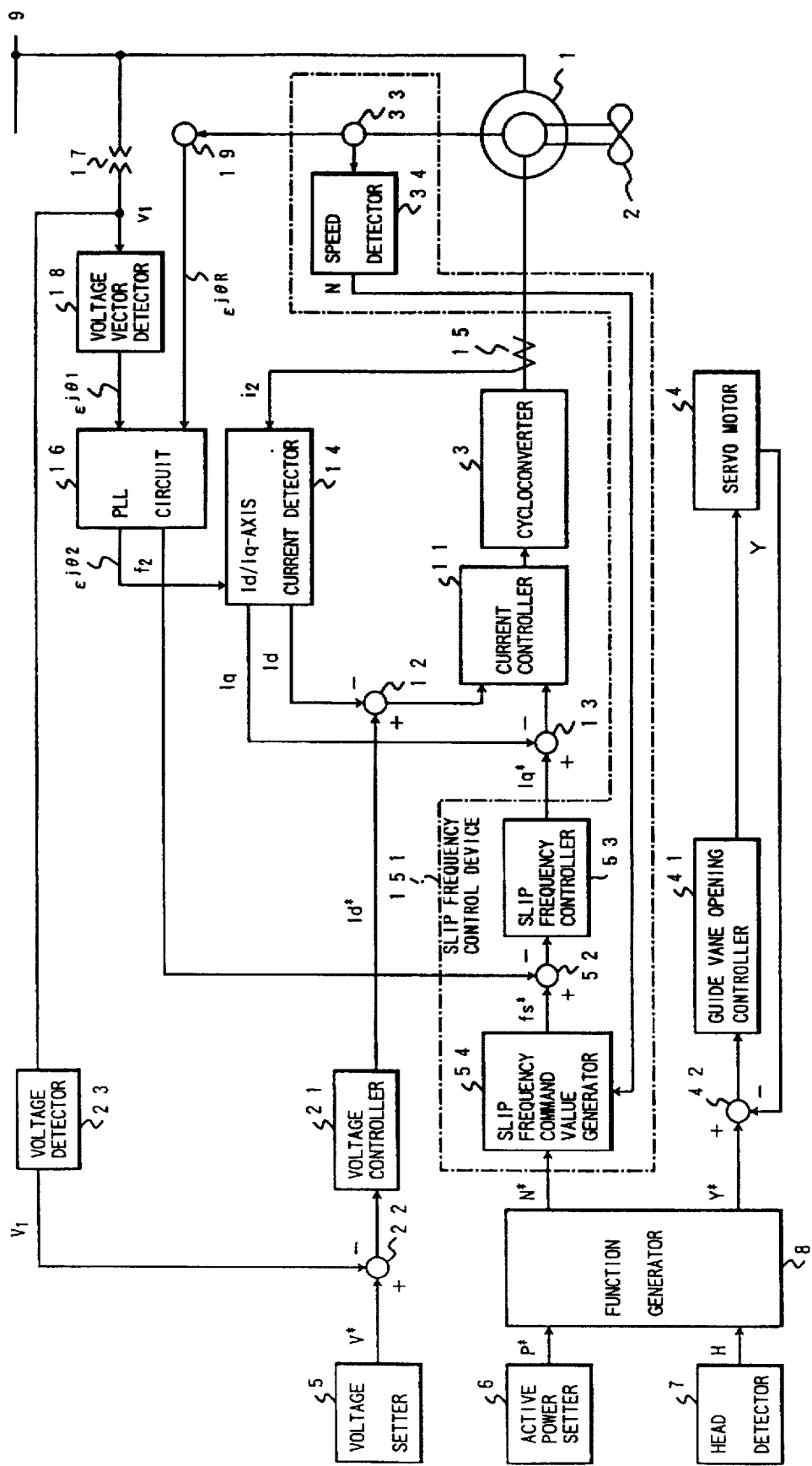
FIG. 16 is a block diagram showing a constitution of a variable speed generator-motor apparatus according to a sixth embodiment relevant to the fifth aspect of the present invention.

There is described a variable speed generator-motor apparatus according to a sixth embodiment corresponding to the fifth aspect of the present invention with reference to the corresponding figure. FIG. 16 shows a constitution of the apparatus according to the sixth embodiment.

In FIG. 16, the apparatus according to the sixth embodiment comprises rotating speed detection means, and a slip frequency control device 151. The rotating speed detection means is newly added in the sixth embodiment and comprises a speed signal generator 33 and a speed detector 34. The device 151 is provided in the place of the slip frequency command value generator 51 and comprises a slip frequency command value generator 54 for calculating a slip frequency command value $f_S^*$ on the basis of the speed command value N* and the rotating speed $N_R$.

There is described function of the apparatus according to the sixth embodiment.

In the sixth embodiment, the slip frequency command value $f_S^*$ is corrected corresponding to the rotating speed in accordance with the following equation (11):

$$f_S^* = f_{S0}^* + \int \{(N^* - N_R)/T_N\} dt \tag{11}$$

where $f_{S0}^*$ is a slip frequency command value when the frequency change in the power system is zero, $T_N$ is a correction integral time constant, and $\int dt$ is an integral.

Since $f_{S0}^*$ is constant and $f_2$ is controlled to coincide with the command value $f_S^*$ by slip frequency control, the equation (11) can be changed to the following equation (12):

$$\begin{aligned} df_S^*/dt &= (f_R^* - f_R)/T_N \\ &= \{(f_0 - f_S^*) - (f_1 - f_2)\}/T_N \\ &= -\Delta f_1/T_N \end{aligned} \tag{12}$$

When it is supposed that $\Delta P_E$ is a correction amount of active power in the induction machine 1, which is changed by correcting the slip frequency command value $f_S^*$, an equation (13) can be established on the basis of an equation of motion for the rotating axis as follows:

$$-\Delta P_E/N_R = T_A \frac{dN_R}{dt} = T_A \frac{df_R}{dt} = T_A \frac{d(f_1 - f_2)}{dt} \quad (13)$$

where $T_A$ is an acceleration time constant of the generator-motor, d/dt denotes a differentiation. Active power, rotation speed and frequency have a positive generation direction, respectively.

When the equation (12) is substituted for the equation (13) under "$f_s^* = f_2$", the equation (13) changes to an equation (14) as follows:

$$-\Delta P_E = N_R T_A (d\Delta f_1/dt + \Delta f_1/T_N) \quad (14)$$

From the equation (14), the variable speed generator-motor apparatus according to the fifth aspect functions for changing the active power $P_E$ corresponding to the frequency change $\Delta f_1$ in the power system.

Accordingly, since the apparatus of the sixth embodiment can change active power in the apparatus corresponding to the frequency change in the power system in addition to effects of the fist and second embodiments corresponding to the first aspect of the present invention, it is possible to more and more contribute the suppression of the frequency change in the power system. The function cannot be realized by the generator-motor apparatus using a synchronous machine disabling slip frequency control, thereby resulting characteristics of the variable speed generator-motor apparatus according to the present invention.

Figure 17:
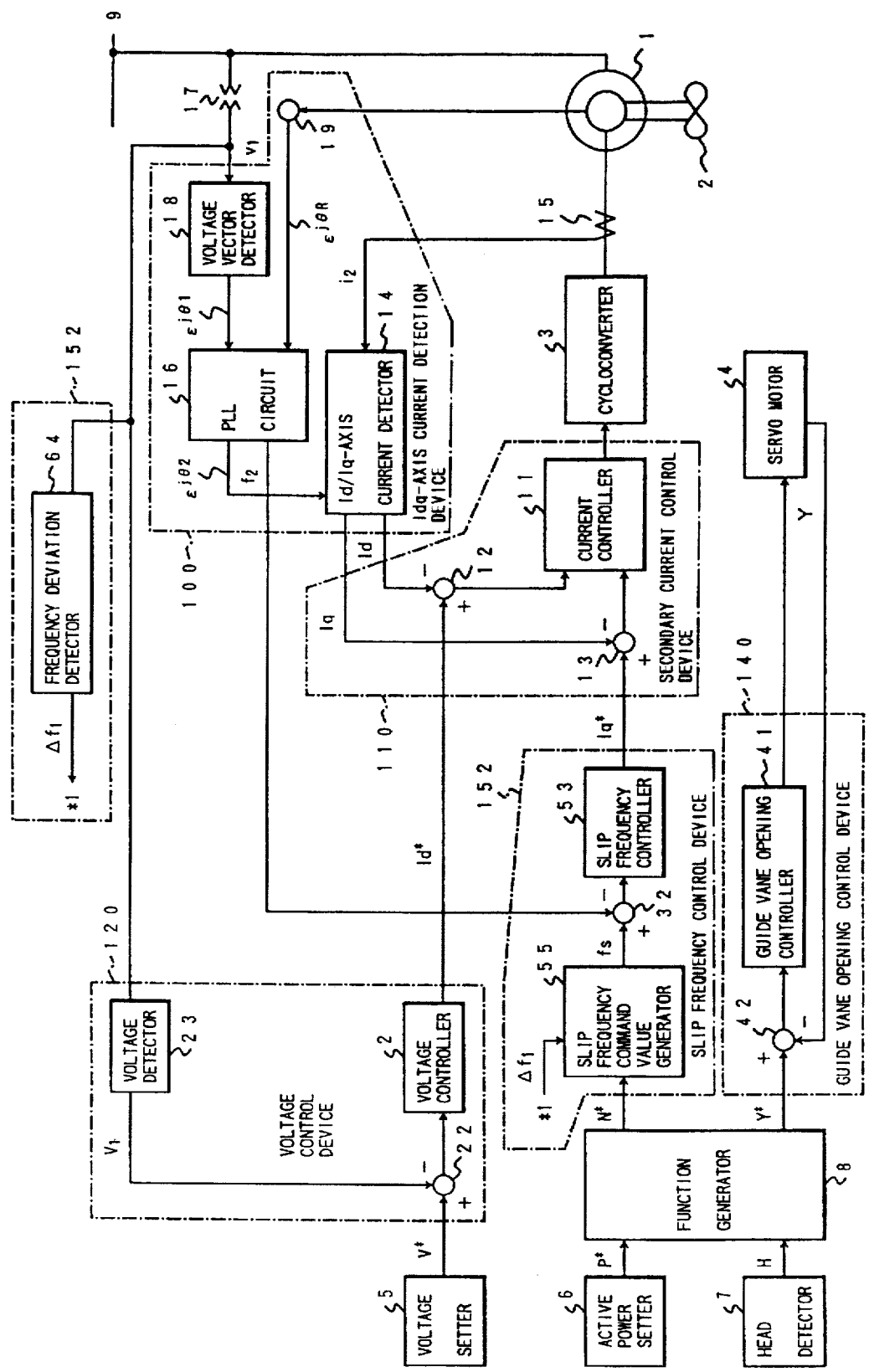
FIG. 17 is a block diagram showing a constitution of a variable speed generator-motor apparatus according to a seventh embodiment relevant to the sixth aspect of the present invention.

There is described a variable speed generator-motor apparatus according to a seventh embodiment corresponding to the sixth aspect of the present invention with reference to the drawings. FIG. 17 is a block diagram of the apparatus according to the seventh embodiment.

The apparatus according to the seventh embodiment shown in FIG. 13 adds a frequency deviation detector 64 for detecting a deviation $\Delta f_1$ between the power system frequency and the reference frequency, and comprises a slip frequency command value generator 55 for constituting a slip frequency control device 152 in the place of the slip frequency command value generator 51. The slip frequency command value generator 55 calculates a slip frequency command value $f_s^*$ on the basis of the speed command value N* and the rotating speed and the deviation $\Delta f_1$.

There is described function of the apparatus according to the seventh embodiment.

In the seventh embodiment, the slip frequency command value $f_s^*$ corresponding to the deviation $\Delta f_1$ between the power system frequency and the reference frequency according to the following equation (15):

$$f_s^* = f_0^* - \int (\Delta f_1/T_N) dt \quad (15)$$

The equation (15) can be changed to the following equation (16):

$$df_s^*/dt = -\Delta f_1/T_N \quad (16)$$

Since the equation (16) has results as the same as those of the equation (12), function of the seventh embodiment is the same as the function of the sixth embodiment.

Accordingly, since the apparatus of the seventh embodiment can change active power in the apparatus corresponding to a change of the power system frequency in addition to the effects of the first and second embodiments according to the first aspect, it is possible to more and more contribute the suppression of the frequency change in the power system. The function can not be realized by the generator-motor apparatus using the synchronous machine disabling the slip frequency control because a direct current excites the synchronous machine, thereby resulting a characteristic effect of the variable speed generator-motor apparatus according to the present invention.

What is claimed is:

1. A variable speed apparatus including a wound-rotor induction generator-motor having a primary winding connected to a power system, a secondary winding excited by an alternating current (AC) and a generator-motor shaft, and a turbine/pump united with the generator-motor shaft, the generator-motor being operable as a generator and as a motor, the apparatus comprising:

an AC excitation frequency detection unit connected to the power system and configured to detect an AC excitation frequency on the basis of power data including a frequency and a voltage phase in the power system and data of the generator-motor shaft, the AC excitation frequency detection unit configured to output an AC excitation frequency signal as a result thereof;

a slip frequency generating unit connected to the AC excitation frequency detection unit and configured to generate a slip frequency command value for the generator-motor; and a slip frequency control unit connected to the AC excitation frequency detection unit and the slip frequency generating unit, said slip frequency control unit configured to receive the slip frequency command value from the slip frequency generating unit and the AC excitation frequency signal from the AC excitation frequency detection unit, said slip frequency control unit configured to control the generator-motor by sending a control signal to the generator-motor to cause a slip frequency of the generator-motor to coincide with the slip frequency command value, even in a case when the AC excitation frequency changes as determined by the AC excitation frequency signal.

2. The variable speed apparatus according to claim 1, wherein said AC excitation frequency detection unit detects the AC excitation frequency on the basis of any of frequency and voltage phase of the power system and any of rotating speed and rotating angle of the generator-motor shaft; and wherein said slip frequency control unit controls the generator-motor such that the slip frequency of the generator-motor becomes equal to the slip frequency command value.

3. The variable speed apparatus according to claim 2, further comprising:

a limiting unit connected to the slip frequency generating unit and configured to limit, within a reference value, the slip frequency command value outputted from the slip frequency generating unit.

4. The variable speed apparatus according to claim 1, further comprising:

a limiting unit connected to the slip frequency generating unit and configured to limit, within a reference value, the slip frequency command value outputted from the slip frequency generating unit, wherein said AC excitation frequency detection unit detects the AC excitation frequency on the basis of any of frequency and voltage phase of the power system and any of rotating speed and rotating angle of the generator-motor shaft; and wherein said slip frequency control unit controls the generator-motor such that the AC excitation frequency becomes equal to the slip frequency command value.

5. The variable speed apparatus according to claim 1, wherein said AC excitation frequency detection unit detects the AC excitation frequency on the basis of any of frequency and voltage phase of the power system and any of rotating speed and rotating angle of the generator-motor shaft; and wherein said slip frequency control unit controls the generator-motor such that the slip frequency of the generator-motor becomes equal to the slip frequency command value; and wherein said apparatus further comprises:

a turbine/pump torque correction unit configured to correct a torque of the turbine/pump corresponding to a frequency change in the power system.

6. The variable speed apparatus according to claim 1, wherein said AC excitation frequency detection unit detects the AC excitation frequency on the basis of any of frequency and voltage phase of the power system and any of rotating speed and rotating angle of the generator-motor shaft; and wherein said slip frequency control unit controls the generator-motor such that the slip frequency of the generator-motor becomes equal to the slip frequency command value; and wherein said apparatus further comprises:

a slip frequency command value correction unit configured to correct the slip frequency command value corresponding to the rotating speed of the generator shaft.

7. The variable speed apparatus according to claim 1, wherein said AC excitation frequency detection unit detects the AC excitation frequency on the basis of any of frequency and voltage phase of the power system and any of rotating speed and rotating angle of the generator-motor shaft; and wherein said slip frequency control unit controls the generator-motor such that the slip frequency of the generator-motor becomes equal to the slip frequency command value; and wherein said apparatus further comprises:

a slip frequency command value correction configured to correct the slip frequency command value corresponding to a frequency change in the power system.

8. A variable speed apparatus including a wound-rotor induction generator-motor having a primary winding connected to a power system having a power system frequency, a secondary winding excited by an alternating current (AC), and a generator-motor shaft, and including a turbine/pump united with the generator-motor shaft, the generator-motor being operable as a generator and as a motor, the apparatus comprising:

a frequency detection unit connected to the power system and configured to detect a change in the power system frequency; and a changing unit connected to the frequency detection unit and configured to change a rotational speed of the generator-motor based on the detected change in the power system frequency, wherein the change in the rotational speed is made substantially equivalent to the detected change in the power system frequency, so as to maintain a slip frequency of the generator-motor essentially constant when the power system frequency changes.

* * * * *